US010818896B2

(12) United States Patent
Zhang et al.

(10) Patent No.: US 10,818,896 B2
(45) Date of Patent: Oct. 27, 2020

(54) FRAME AND BATTERY MODULE

(71) Applicant: CONTEMPORARY AMPEREX TECHNOLOGY CO., LIMITED, Ningde (CN)

(72) Inventors: Shangfu Zhang, Ningde (CN); Kaiqin Yu, Ningde (CN); Yincheng Huang, Ningde (CN); Lin Ma, Ningde (CN); Derong Wang, Ningde (CN); Linggang Zhou, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 168 days.

(21) Appl. No.: 16/053,579

(22) Filed: Aug. 2, 2018

(65) Prior Publication Data

US 2019/0067656 A1 Feb. 28, 2019

(30) Foreign Application Priority Data

Aug. 31, 2017 (CN) .......................... 2017 1 0768421

(51) Int. Cl.
*H01M 2/10* (2006.01)
*H01M 2/02* (2006.01)
(Continued)

(52) U.S. Cl.
CPC ....... *H01M 2/1077* (2013.01); *H01M 2/0247* (2013.01); *H01M 2/1094* (2013.01); *H01M 10/647* (2015.04); *H01M 2220/20* (2013.01)

(58) Field of Classification Search
CPC ............ H01M 2/10; H01M 2/12; H01M 2/02; H01M 2/04
See application file for complete search history.

(56) References Cited

U.S. PATENT DOCUMENTS

2014/0023894 A1 1/2014 Jansen et al.
2014/0234691 A1 8/2014 Lee et al.
(Continued)

FOREIGN PATENT DOCUMENTS

CN 202817049 U 3/2013

OTHER PUBLICATIONS

Machine Translation of: CN 202817049U, Li et al., Mar. 20, 2013.*
(Continued)

*Primary Examiner* — Kenneth J Douyette
(74) *Attorney, Agent, or Firm* — Morgan, Lewis & Bockius LLP

(57) ABSTRACT

The present disclosure provides a frame and a battery module. The frame is composed of a peripheral wall, the peripheral wall encloses to form a receiving cavity closed in a circumferential direction and opened at two ends in an axial direction, the peripheral wall is provided with at least one adhesive injection hole passing through the peripheral wall. The battery module comprises a plurality of secondary batteries arranged side by side, the frame and an adhesive. The secondary batteries are received in the receiving cavity. The adhesive comprises: a first part which adheres every two adjacent secondary batteries; a second part which adheres two secondary batteries positioned at outermost sides of the plurality of secondary batteries in an arrangement direction with the peripheral wall; a third part which adheres a lower side of the first part and a lower side of the second part with the peripheral wall.

10 Claims, 10 Drawing Sheets

(51) Int. Cl.
*H01M 2/12* (2006.01)
*H01M 10/647* (2014.01)

(56) References Cited

U.S. PATENT DOCUMENTS

| | | | |
|---|---|---|---|
| 2015/0179995 A1* | 6/2015 | Nakamura | H01M 10/6561 |
| | | | 429/120 |
| 2016/0093851 A1 | 3/2016 | Lobert et al. | |
| 2016/0233465 A1 | 8/2016 | Lee et al. | |

OTHER PUBLICATIONS

Contemporary Amperex Technology Co., Limited, Extended European Search Report, EP18186820.9, dated Nov. 13, 2018, 7 pgs.
Contemporary Amperex Technology Co., Limited, Intention to Grant, EP18186820.9, dated Jan. 29, 2020, 5 pgs.

* cited by examiner

FRAME AND BATTERY MODULE

CROSS-REFERENCE TO RELATED APPLICATIONS

The present application claims priority to Chinese patent application No. CN201710768421.2, filed on Aug. 31, 2017, which is incorporated herein by reference in its entirety.

FIELD OF THE PRESENT DISCLOSURE

The present disclosure relates to the field of secondary battery, and particularly relates to a frame and a battery module.

BACKGROUND OF THE PRESENT DISCLOSURE

A secondary battery has various forms. Depending on the type of the case, the secondary battery can be divided into a pouch-shaped secondary battery and a can-shaped secondary battery. The case of the pouch-shaped secondary battery is made of a laminate sheet comprising polymer layers and a metal layer. The case of the can-shaped secondary battery usually is composed of a metal shell and a metal cap plate.

A battery module usually comprises a plurality of secondary batteries which are arranged side by side and fixed by a corresponding frame. The assembling process of the battery module using the can-shaped secondary batteries usually is: compressing the plurality of can-shaped secondary batteries arranged with a front end plate and a rear end plate together, and then welding and fixing two side plates to the end plates, finally, providing a water cooling system (even a thermal conductive silicone pad) below a bottom of the plurality of can-shaped secondary batteries.

Compared with the can-shaped secondary battery, the pouch-shaped secondary battery has no external metal, which will result in the assembling of the battery module using the pouch-shaped secondary batteries to be difficult and low efficiency of heat dissipation. In order to resolve the problem in assembling and heat dissipation, it usually needs to coat an adhesive to adhere the pouch-shaped secondary battery (batteries) to metal plates (usually aluminum plates) so as to be assembled into a small unit and then arrange and fix the small units, finally like the battery module using the can-shaped secondary batteries, provide a water cooling system (even a thermal conductive silicone pad) below a bottom of the small units, the heat is transferred from the pouch-shaped secondary batteries to the water cooling system via the metal plates. But it will cause the following problems: because the pouch-shaped secondary batteries expand seriously, the expansion spaces need to be reserved between the pouch-shaped secondary batteries, at the same time, in order to reduce an overall weight and cost of the battery module, the aluminum plate is usually thinner, which causes the heat dissipation path to be insufficient and the heat dissipation efficiency to be lower; when the aluminum plates are used to fix the pouch-shaped secondary batteries and dissipate heat of the pouch-shaped secondary batteries, the pouch-shaped secondary battery (batteries) and the aluminum plates need to be assembled into a small unit, and then the small units are assembled into a battery module, this process is more complicated and the assembling of the battery module is complicated; the manner that uses the pouch-shaped secondary battery (batteries) and the aluminum plates to be assembled into a small unit and then uses the small units to be assembled into a battery module has no effective mutual constraint between the small units, which will cause an overall rigidity of the battery module to be poor; the planeness between the aluminum plate and the pouch-shaped secondary battery can not be guaranteed, which increases local thermal resistance; the bottoms of the aluminum plates of the plurality of small units in the battery module have planeness tolerances so that the insufficient contact between a part of the aluminum plates and a contact surface of the thermal conductive silicone pad also reduces the efficiency of heat dissipation.

But whether a battery module using the can-shaped secondary batteries or a battery module using the pouch-shaped secondary batteries both need a further improvement in the assembling of the battery module so as to improve the assembling efficiency of the battery module and improve the overall rigidity of the battery module.

SUMMARY OF THE PRESENT DISCLOSURE

In view of the problem exiting in the background, an object of the present disclosure is to provide a frame and a battery module, which can reduce assembling processes, improve the assembling efficiency of the battery module, while improve the overall rigidity of the battery module when the frame is applied to the battery module.

In order to achieve the above object, in a first aspect, the present disclosure is to provide a frame which is composed of a peripheral wall, the peripheral wall encloses to form a receiving cavity which is closed in a circumferential direction and is opened at two ends in an axial direction, the peripheral wall is provided with at least one adhesive injection hole passing through the peripheral wall.

In order to achieve the above object, in a second aspect, the present disclosure is to provide a battery module, which comprises a plurality of secondary batteries arranged side by side; the battery module further comprises the frame according to the first aspect of the present disclosure and an adhesive. The plurality of secondary batteries arranged side by side are received in the receiving cavity of the frame. The adhesive comprises: a first part which adheres every two adjacent secondary batteries together; a second part which adheres two secondary batteries positioned at outermost sides of the plurality of secondary batteries in an arrangement direction and the peripheral wall of the frame together; a third part which adheres a lower side of the first part and a lower side of the second part and the peripheral wall together.

The present disclosure has the following beneficial effects: when the frame according to the first aspect of the present disclosure is applied to the battery module, it reduces assembling processes, improves the assembling efficiency and the overall rigidity of the battery module, improves the anti-deformation capability when the battery module is subjected to impact and/or vibration.

Figure 1:
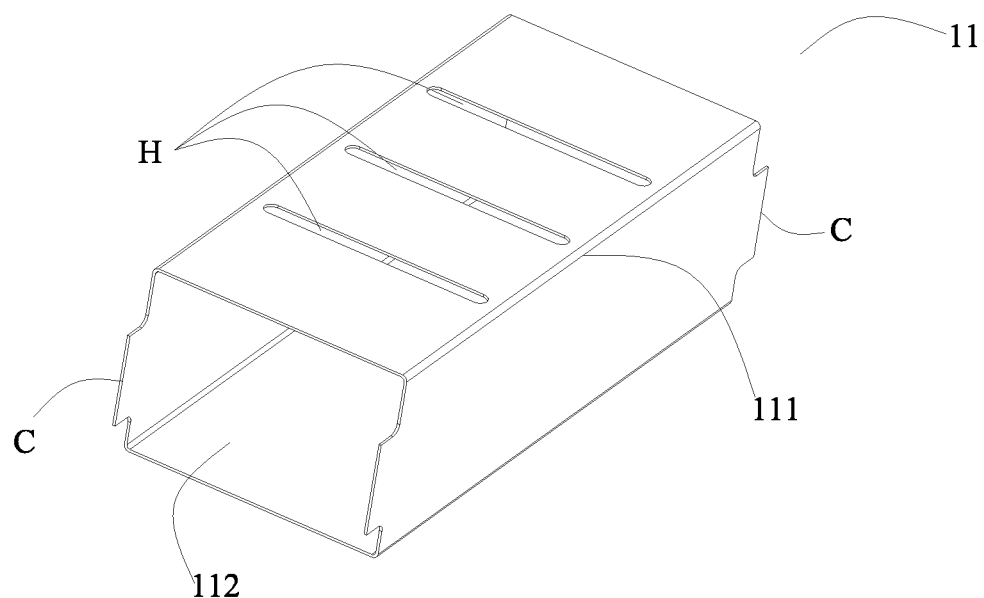
FIG. 1 is a perspective view of a frame according to the present disclosure.

REFERENCE NUMERALS ARE REPRESENTED AS FOLLOWS 1 battery module
11 frame
111 peripheral wall
H adhesive injection hole
T top wall
B bottom wall
S side wall
C protruding portion
C1 through hole
112 receiving cavity
12 secondary battery
121 electrode tab
13 adhesive
131 first part
132 second part
133 third part
134 fourth part
14 position-limiting structure
141 elastic buffering pad
143 spacing plate
1431 body portion
G groove
1432 extending portion
15 electrical conductive connection piece
16 first end plate
161 first plate body
162 first insert
1621 first step portion
S1 first surface
S2 second surface
17 second end plate
171 second plate body
172 second insert
1721 second step portion
S3 third surface
S4 fourth surface
h screw hole
b screw

DETAILED DESCRIPTION

Hereinafter a frame and a battery module according to the present disclosure will be described in detail in combination with the figures.

Firstly, a frame according to a first aspect of the present disclosure will be described.

Figure 2:
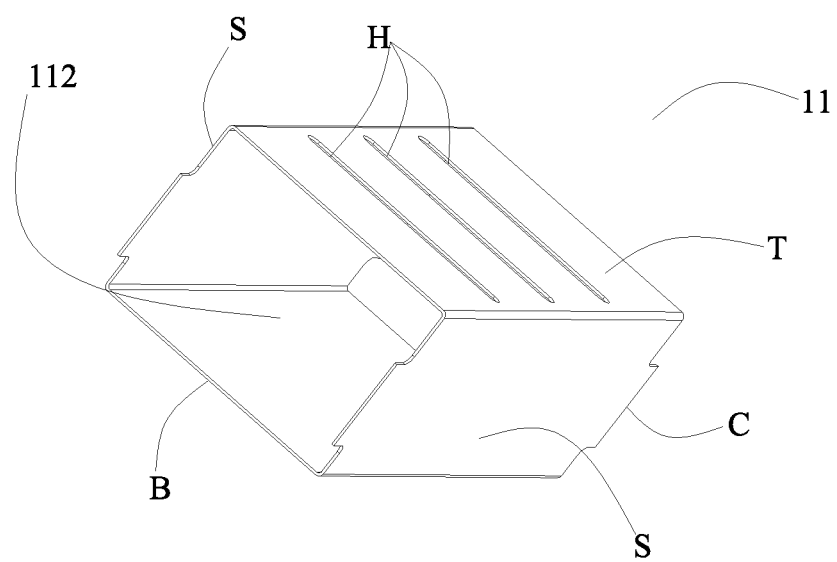
FIG. 2 is a perspective view of FIG. 1 viewed from another angle.
Figure 3:
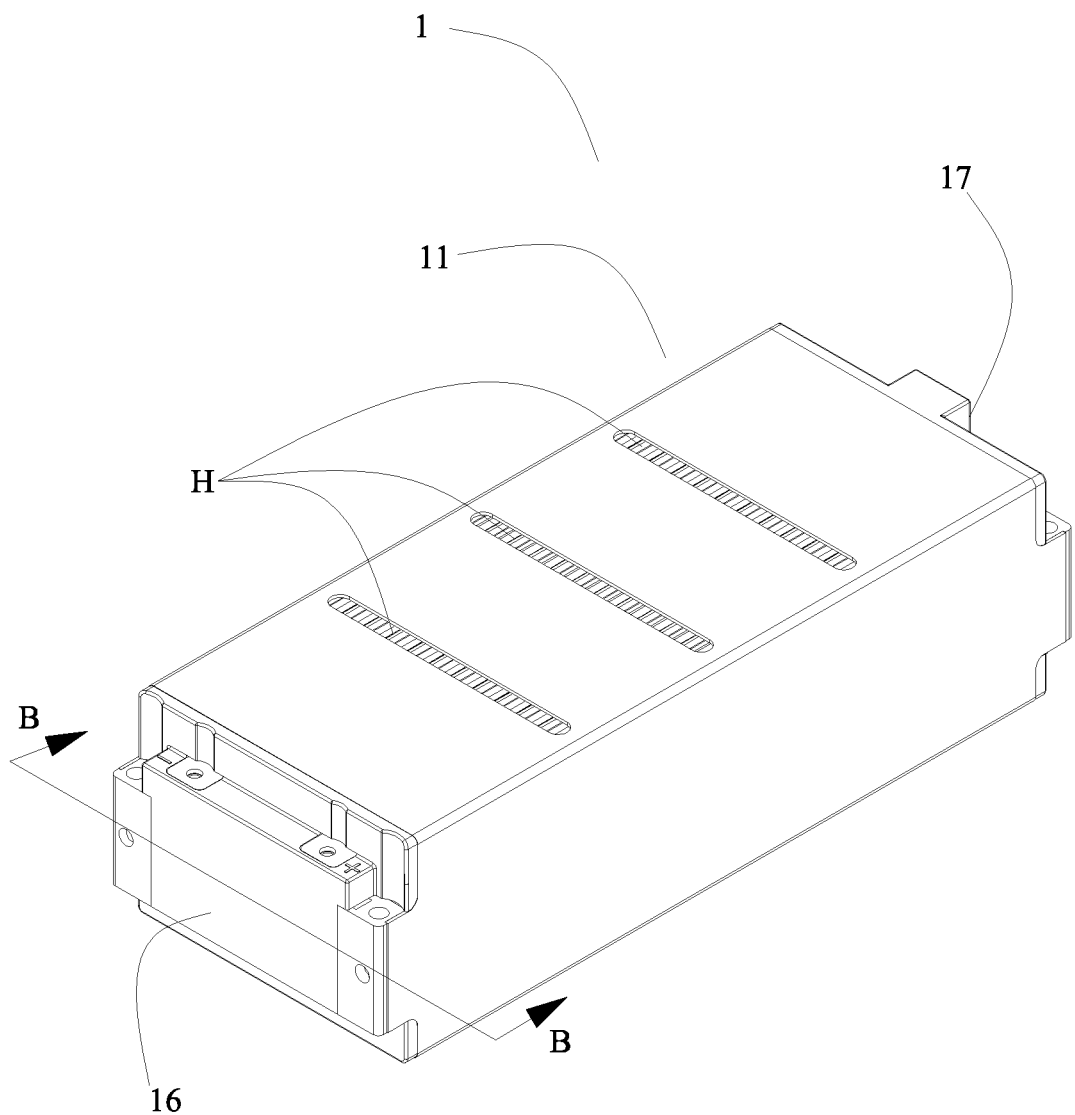
FIG. 3 is a perspective view of an embodiment of a battery module according to the present disclosure.

As shown in FIG. 1 and FIG. 2, a frame 11 according to the present disclosure is composed of a peripheral wall 111, the peripheral wall 111 encloses to form a receiving cavity 112 which is closed in a circumferential direction and is opened at two ends in an axial direction, the peripheral wall 111 is provided with at least one adhesive injection hole H passing through the peripheral wall 111.

When the frame 11 according to the first aspect of the present disclosure is applied to a battery module 1 described below, a plurality of secondary batteries 12 arranged side by side can be directly inserted into the frame 11, because the peripheral wall 111 is provided with at least one adhesive injection hole H passing through the peripheral wall 111, the adhesive 13 in liquid state can be injected into the battery module 1 via the adhesive injection hole H, after the adhesive 13 in liquid state has cured, the plurality of secondary batteries 12 arranged side by side can be fixed. The adhesive 13 achieves the effective constraints between the adjacent secondary batteries 12 and between the peripheral wall 111 and the corresponding secondary battery 12, which reduces the assembling processes of the battery module 1, improves the assembling efficiency and the overall rigidity of the battery module 1, and improves the anti-deformation capability when the battery module 1 is subjected to impact and/or vibration compared with the assembling manner of the battery module using the can-shaped secondary batteries and the assembling manner of the battery module using the pouch-shaped secondary batteries in the prior art. In addition, the adhesive 13 reduces the requirement for the planeness of the surfaces of the secondary batteries 12, and improves the adaptability with the planenesses of the surfaces of the secondary batteries 12.

As shown in FIG. 1 and FIG. 2, the peripheral wall 111 is composed of a top wall T, a bottom wall B and two side walls S.

The top wall T, the bottom wall B and the two side walls S are integrally formed, or the top wall T, the bottom wall B and the two side walls S are separately formed and are connected together (i.e., they are separately formed and then connected together by welding). Preferably, the top wall T, the bottom wall B and the two side walls S are integrally formed, so that the overall rigidity of the frame 11 is higher than the frame 11 separately formed.

In an embodiment, as shown in FIG. 1 and FIG. 2, the adhesive injection hole H is provided on the top wall T (if the frame 11 is formed by an extrusion process, the adhesive injection hole H is formed on the frame 11 by a subsequent processing), of course, the position of the adhesive injection hole H is not limited to this, and the specific position of the adhesive injection hole H can be selected according to the specific circumstance.

The frame 11 is made of metal, which can improve the anti-impact capability of the frame 11 so as to further enhance the overall rigidity of the battery module 1 described below and provide protection to the secondary batteries 12 in the frame 11. The metal is aluminum. The frame 11 is formed by an extrusion process. The extrusion process can form a frame 11 integrally formed and closed in the circumferential direction.

As shown in FIG. 1 and FIG. 2, two ends of the peripheral wall 111 in the axial direction are provided with protruding portions C protruding outwardly along the axial direction. The protruding portions C of the two ends in the axial direction are respectively used to weld together with a first insert 162 of a first end plate 16 and a second insert 172 of a second end plate 17 of the battery module 1 described below.

Secondly, a battery module according to a second aspect of the present disclosure will be described.

As shown in FIG. 3 to FIG. 6 and FIG. 14, FIG. 15, a battery module 1 according to the present disclosure comprises a plurality of secondary batteries 12 arranged side by side; the battery module 1 further comprises the frame 11 according to the first aspect of the present disclosure and an adhesive 13, the plurality of secondary batteries 12 arranged side by side are received in the receiving cavity 112 of the frame 11. The adhesive 13 comprises: a first part 131 which adheres every two adjacent secondary batteries 12 together; a second part 132 which adheres two secondary batteries 12 positioned at outermost sides of the plurality of secondary batteries 12 in an arrangement direction and the peripheral wall 111 of the frame 11 together; a third part 133 which adheres a lower side of the first part 131 and a lower side of the second part 132 and the peripheral wall 111 together.

In the battery module 1 according to the second aspect of the present disclosure, a plurality of secondary batteries 12 arranged side by side are received in the receiving cavity 112 of the frame 11, and the adhesive 13 is distributed between every two adjacent secondary batteries 12, between two secondary batteries 12 positioned at the outermost sides of the arrangement direction and the peripheral wall 111 of the frame 11 and between the lower side of the first part 131 of the adhesive 13 and the lower side of the second part 132 of the adhesive 13 and the peripheral wall 111, the assembling design that the battery module 1 of the second aspect of the present disclosure uses the adhesive 13 and the frame 11 realizes effective constraints between every two adjacent secondary batteries 12 and between the peripheral wall 111 and the corresponding two secondary batteries 12; and the third part 133 of the adhesive 13 adhering the lower side of the first part 131 of the adhesive 13 and the lower side of the second part 132 of the adhesive 13 and the peripheral wall 111 together realizes that the plurality of secondary batteries 12 are connected with the frame 11 as a whole; the above design improves the assembling efficiency and the overall rigidity of the battery module 1, and improves the anti-deformation capability of the battery module 1 when the battery module 1 is subjected to impact and/or vibration, compared with the assembling method of the battery module using the can-shaped secondary batteries and the assembling method of the battery module using the pouch-shaped secondary batteries in the prior art. In addition, since a compressive strength of the adhesive 13 itself is lower than a compressive strength of an electrode assembly (not shown, the electrode assembly usually comprises a positive electrode plate, a negative electrode plate and a separator) in the secondary battery 12, the adhesive 13 is easily deformed when expansion of the secondary batteries 12 occurs in the charge-discharge cycle, so the expansion of the secondary batteries 12 can be buffered during the charge-discharge cycle. In addition, the adhesive 13 reduces the requirement for the planenesses of the surfaces of the secondary batteries 12 and the uniformity of the gaps in the receiving cavity 112, and improves the adaptability to the planeness of the surfaces of the secondary batteries 12 and the gaps existing in the receiving cavity 112.

Figure 5:
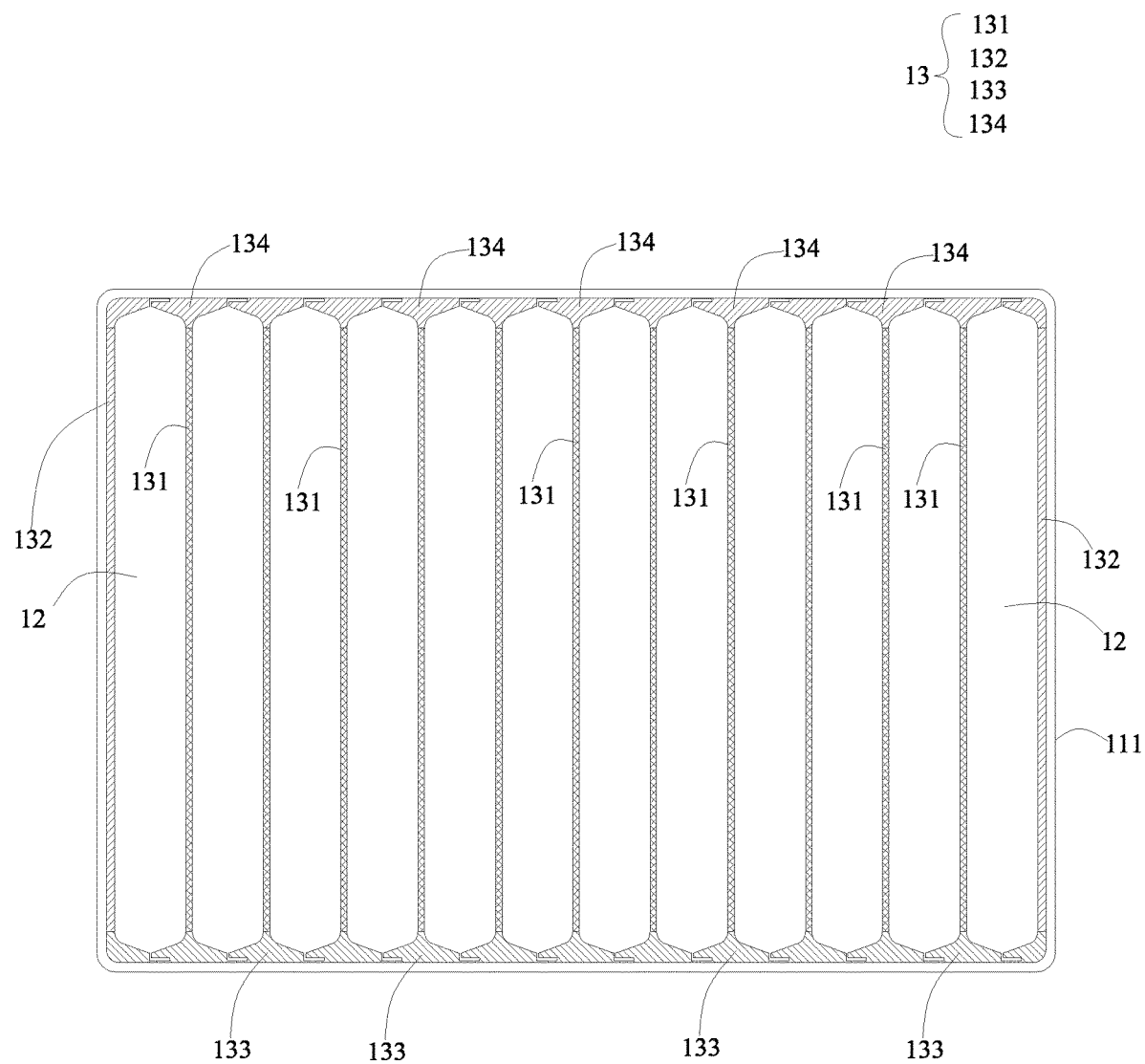
FIG. 5 is an enlarged cross sectional view taken along an A-A line of FIG. 4.

In addition, as shown in FIG. 5, the adhesive 13 further comprises: a fourth part 134 which adheres an upper side of the first part 131 of the adhesive 13 and an upper side of the second part 132 of the adhesive 13 and the peripheral wall 111 together. The adhesive 13 is injected in liquid state, and after injected sufficiently and cured, the adhesive 13 will forms the first part 131, the second part 132, the third part 133 and the fourth part 134, two sides of each secondary battery 12 fully contact and adhere with the adhesive 13, which enhances the effective constraints between the secondary batteries 12 so as to ensure all secondary batteries 12 can work stably.

The type of the adhesive 13 is not limited, but must have a liquid state and a curing property. In order to achieve the heat dissipation of the secondary batteries 12, preferably, the adhesive 13 is thermally conductive, and the peripheral wall 111 of the frame 11 is thermally conductive. Further preferably, the adhesive 13 is a thermally conductive structural adhesive, which can not only ensure the position fixation and the anti-impact capability of the secondary batteries 12 through the strong adhesion of the structural adhesive, but also can effectively ensure the stability of the heat dissipation path. The heat generated is transferred to the third part 133 of the adhesive 13 and the fourth part 134 of the adhesive 13 via the first part 131 of the adhesive 13 and the second part 132 of the adhesive 13, and in turn is transferred to the peripheral wall 111 of the frame 11, and finally is dissipated out from the peripheral wall 111 (such as direct heat radiation or heat exchanged between the peripheral wall 111 and an external cooling system (not shown)), thus the heat dissipation path is effectively increased and the heat dissipation efficiency is improved. When an external cooling system is used, the external cooling system is usually provided below the bottom wall B of the peripheral wall 111, while the two side walls S and the top wall T of the peripheral wall 111 still transfer heat to the external cooling system so as to increase the thermal connection with the external cooling system, and then enhance the heat dissipation effect. In addition, the two side walls S and the top wall T of the peripheral wall 111 can also be cooled by air so as to enhance the flexibility of the heat dissipation mode.

Figure 4:
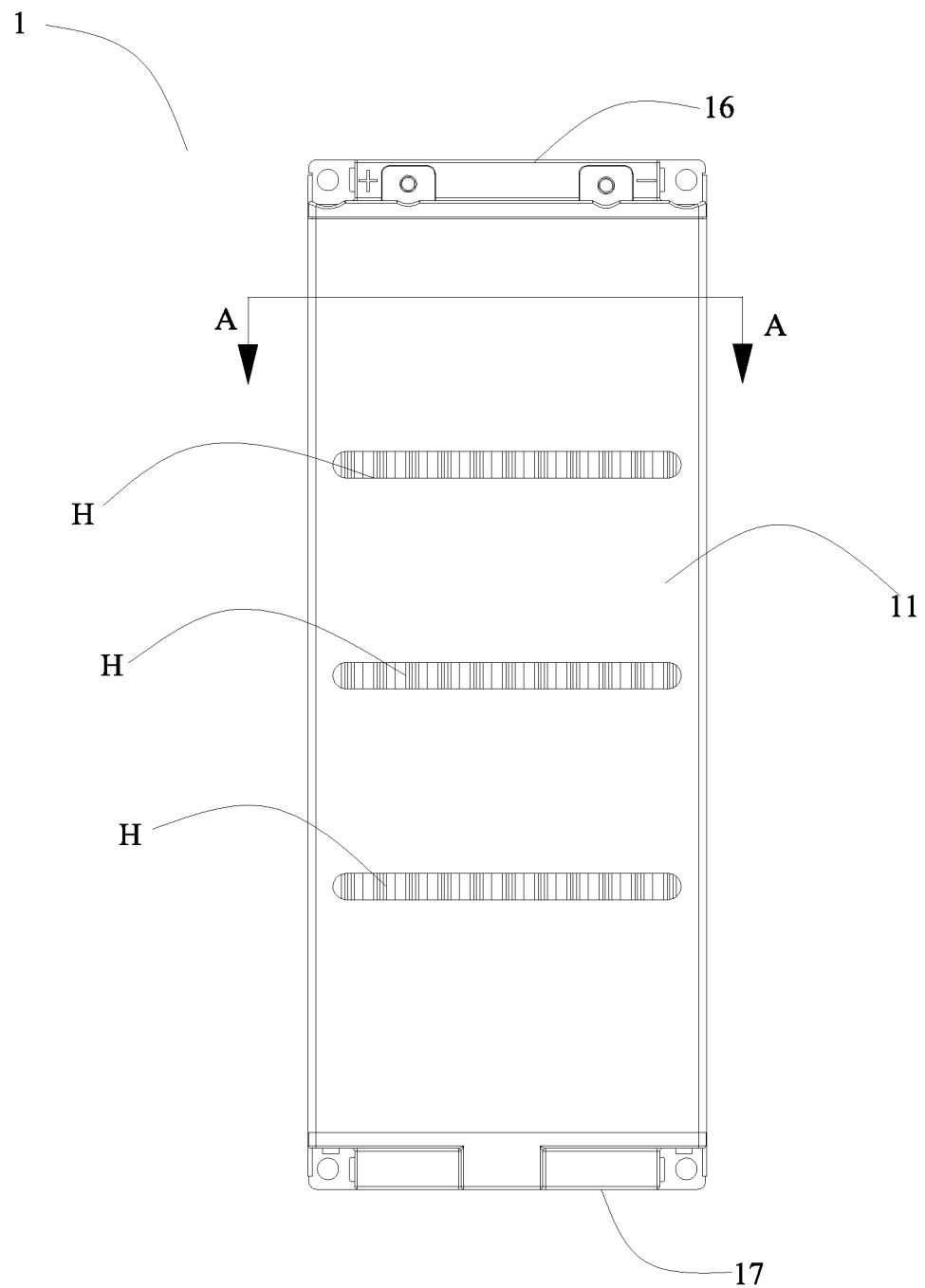
FIG. 4 is a top view of FIG. 3.
Figure 10:
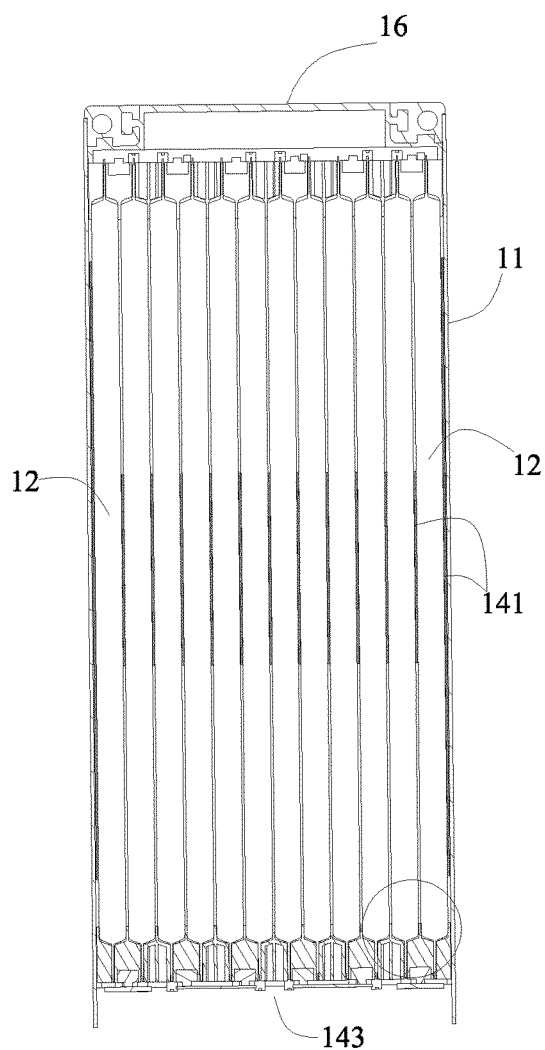
FIG. 10 is a schematic view taken along a B-B line of FIG. 3 with a second end plate removed.
Figure 11:
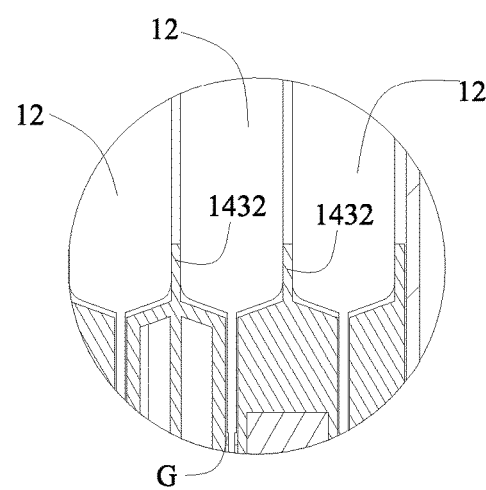
FIG. 11 is an enlarged view of a circle part in FIG. 10.

In addition, the frame 11 which is thermally conductive and enclosed by the peripheral wall 111 to be closed in the circumferential direction can use the whole peripheral wall 111 to dissipate heat, which improves the heat dissipation effect of the battery module 1. It should be noted that, what is shown in FIG. 5 is a cross sectional view only taken along the line A-A (the position of the line A-A is not related to the elastic buffering pad 141) in FIG. 4, and does not mean that the cross sectional view taken along any position parallel to the A-A line in FIG. 4 is the same as FIG. 5, for example, as shown in FIG. 10, the elastic buffering pads 141 are respectively provided between every two adjacent secondary batteries 12, and thus the position between every two adjacent secondary batteries 12 also has an elastic buffering pad 141 besides the adhesive 13 in the cross sectional view taken along the center of the axial direction of the battery module 1, so that the specific cross sectional view may be determined according to the specific cross sectional position.

As shown in FIG. 6 to FIG. 9, the battery module 1 according to the second aspect of the present disclosure further comprises: a position-limiting structure 14 which spaces every two adjacent secondary batteries 12 apart and spaces the secondary batteries 12 positioned at the outermost sides of the plurality of secondary batteries 12 in the arrangement direction apart from the peripheral wall 111 of the frame 11. Therefore the plurality of secondary batteries 12 in the frame 11 are pre-positioned before injecting the adhesive 13 and the gaps between every two adjacent secondary batteries 12 for the adhesive 13 in liquid state to flow into and the gaps between the secondary batteries 12 positioned at the outermost sides of the plurality of secondary batteries 12 in the arrangement direction and the peripheral wall 111 of the frame 11 for the adhesive 13 in liquid state to flow into are guaranteed.

The position-limiting structure 14 may have many forms.

Figure 6:
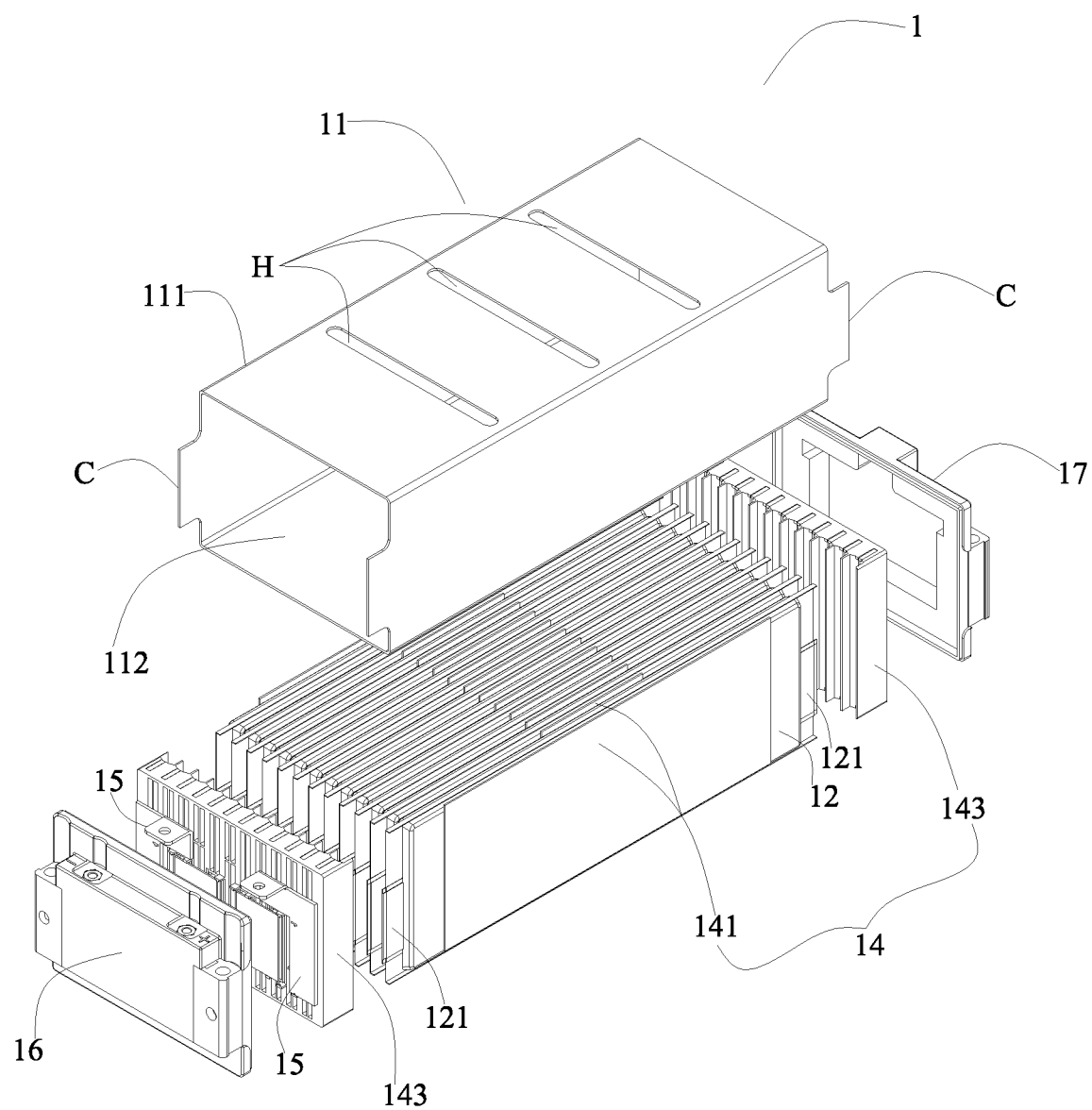
FIG. 6 is an exploded perspective view of FIG. 3.
Figures 7, 8:
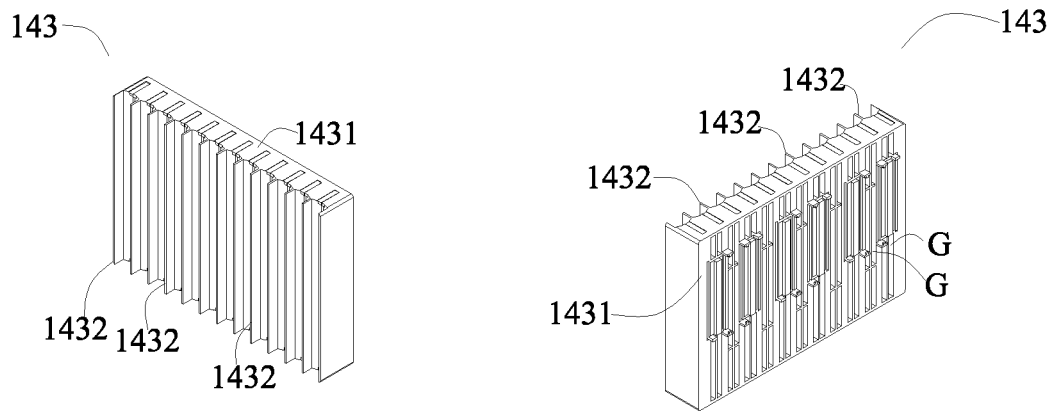
FIG. 7 is a perspective view of a spacing plate of the battery module according to the present disclosure.
FIG. 8 is a perspective view of FIG. 7 viewed from another angle.

For example, in an embodiment of the position-limiting structure 14, referring to FIG. 6, the position-limiting structure 14 comprises: a plurality of elastic buffering pads 141 respectively positioned between every two adjacent secondary batteries 12 and between the secondary batteries 12 positioned at the outermost sides of the plurality of secondary batteries 12 in the arrangement direction and the peripheral wall 111 of the frame 11. The plurality of elastic buffering pads 141 are arranged such that there are gaps for the adhesive 13 to fill into between every two adjacent secondary batteries 12 and between the secondary batteries 12 positioned at the outermost sides of the plurality of secondary batteries 12 in the arrangement direction and the peripheral wall 111 of the frame 11. It is easy to mount the arranged secondary batteries 12 and the elastic buffering pads 141 into the frame 11 based on the elastic compression performance of the elastic buffering pads 141 during assembling. In addition, based on the elastic recovery performance, the elastic buffering pads 141 allows the plurality of secondary batteries 12 arranged together to maintain the stability in structure, so that the structure of the plurality of secondary batteries 12 arranged together will not largely change and will not loosen when the battery module 1 is subjected to external impact and/or vibration; and the external impact and/or vibration are transferred to the elastic buffering pads 141 via one side of the peripheral wall 111 of the frame 11 and are buffered and reduced and then returns to the opposite side of the peripheral wall 111 of the frame 11 and are further buffered and reduced. Each elastic buffering pad 141 may be a foam.

In another embodiment of the position-limiting structure 14, the position-limiting structure 14 comprises: a plurality of position-limiting adhesive layers (not shown) positioned between every two adjacent secondary batteries 12 and positioned between the secondary batteries 12 positioned at the outermost sides of the plurality of secondary batteries 12 in the arrangement direction and the peripheral wall 111 of the frame 11. The arrangement of the plurality of position-limiting adhesive layers also performs function of limiting the positions of the plurality of secondary batteries 12. The position-limiting adhesive layers can perform the same function as the elastic buffering pads 141.

In still another embodiment of the position-limiting structure 14, referring to FIG. 6 to FIG. 11, the position-limiting structure 14 comprises two spacing plates 143 respectively provided at two ends of the frame 11 in the axial direction, each spacing plate 143 comprises a body portion 1431 and a plurality of extending portions 1432 spaced apart from each other and arranged on a surface of the body portion 1431, the plurality of extending portions 1432 of each spacing plate 143 are respectively clamped between every two adjacent secondary batteries 12 and between the secondary batteries 12 positioned at the outermost sides of the plurality of secondary batteries 12 in the arrangement direction and the peripheral wall 111 of the frame 11. In this embodiment, the extending portions 1432 of the two spacing plates 143 perform function of limiting the positions of the plurality of secondary batteries 12, the two spacing plates 143 are respectively provided at the two ends of the frame 11 in the axial direction, which makes the adhesive 13 in liquid state not flow out of the two ends of the plurality of secondary batteries 12 in the axial direction during the injection. The spacing plate 143 is made of an insulating material.

Of course, the position-limiting structure 14 is not limited to the above three cases, and there are other alternatives, such as shown in FIG. 6, the spacing plates 143 and the plurality of elastic buffering pads 141 are combined for position-limiting.

The secondary battery 12 can use various forms, depending on the type of the case, the secondary battery 12 can be a pouch-shaped secondary battery or a can-shaped secondary battery. The case of the pouch-shaped secondary battery is made of a laminate sheet comprising polymer layers and a metal layer. The case of the can-shaped secondary battery usually is composed of a metal shell and a metal cap plate.

Figure 14:
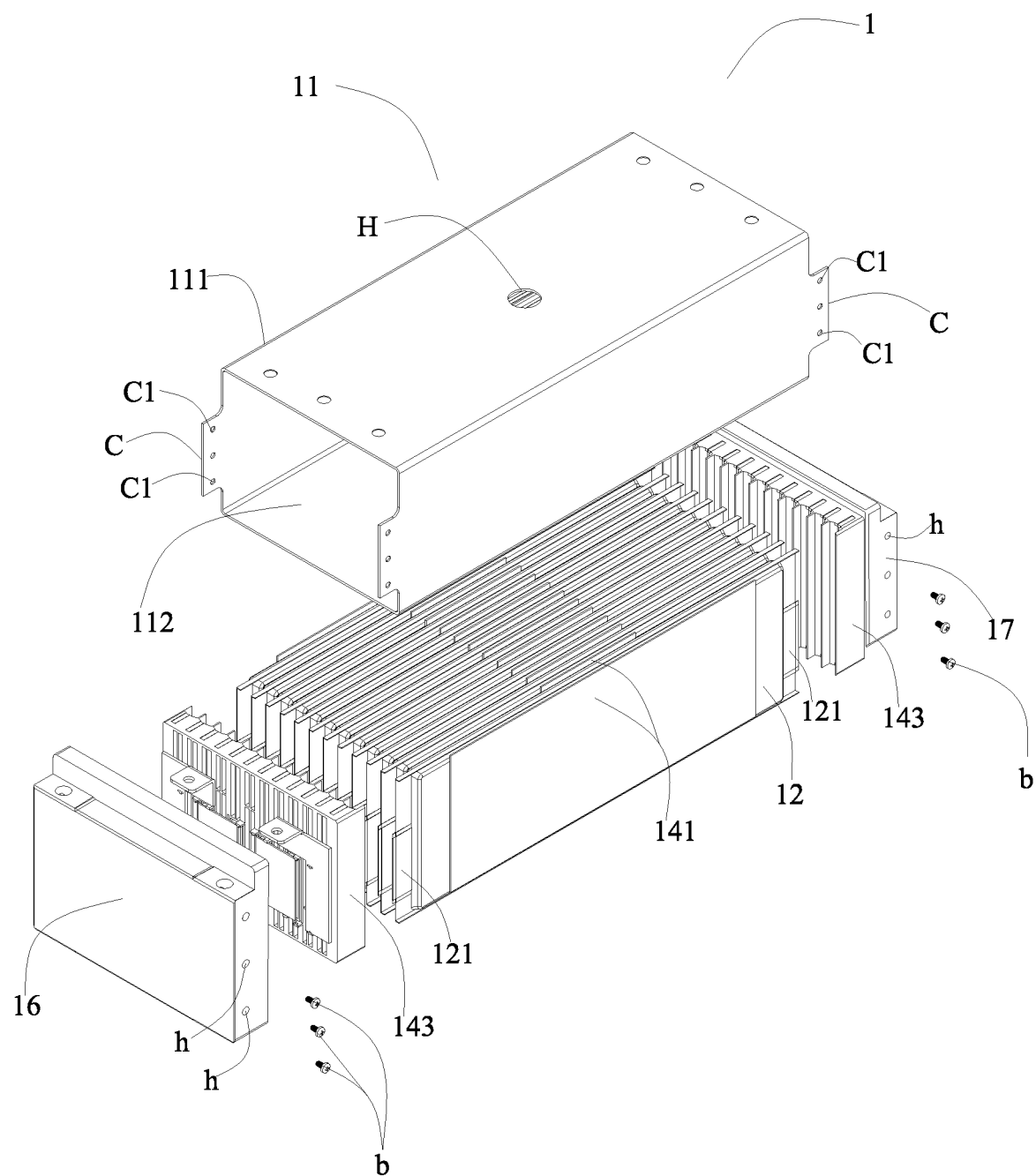
FIG. 14 is an exploded perspective view of another embodiment of the battery module according to the present disclosure, in which the first end plate and the second end plate are connected with the frame by screws.

In an embodiment, as shown in FIG. 6 and FIG. 14, the secondary battery 12 is a pouch-shaped secondary battery, each secondary battery 12 has two electrode tabs 121 which are opposite in polarity and respectively extend toward the two ends of the frame 11 in the axial direction; the body portion 1431 of each spacing plate 143 is provided with a plurality of grooves G passing through the body portion 1431, each electrode tab 121 of each secondary battery 12 passes through the corresponding groove G. By that the electrode tab 121 of the secondary battery 12 passes through the corresponding groove G, on one hand, it helps to make every two adjacent secondary batteries 12 spaced apart from each other and make the secondary batteries 12 positioned at the outermost sides of the plurality of secondary batteries 12 in the arrangement direction spaced apart from the peripheral wall 111 of the frame 11, so that the plurality of secondary batteries 12 in the frame 11 are pre-positioned and the gaps between every two adjacent secondary batteries 12 for the adhesive 13 in liquid state to flow into and the gaps between the secondary batteries 12 positioned at the outermost sides of the plurality of secondary batteries 12 in the arrangement direction and the peripheral wall 111 of the frame 11 for the adhesive 13 in liquid state to flow into are guaranteed before the adhesive 13 in liquid state is injected; on the other hand, it can protect the electrode tabs 121 from being damaged when the battery module 1 is subjected to impact and/or vibration. In addition, it also facilitates the arrangement of the electrical conductive connection pieces 15 describe below.

Figure 9:
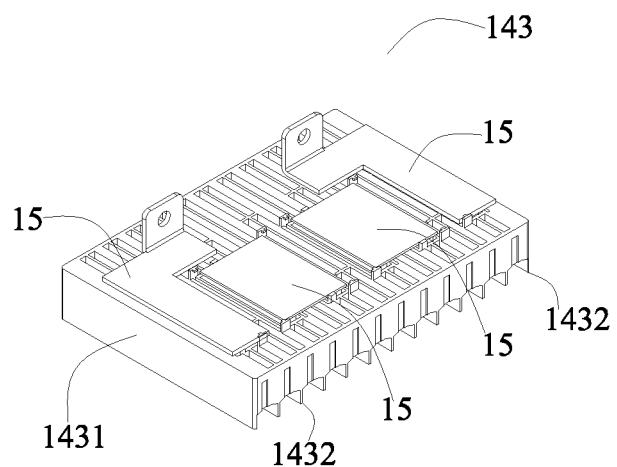
FIG. 9 is a perspective view of FIG. 7 viewed from another angle in which a body portion of the spacing plate is provided with electrical conductive connection pieces.

Moreover, as shown in FIG. 9, the battery module 1 further comprises a plurality of electrical conductive connection pieces 15, each electrical conductive connection piece 15 is fixed on a surface of the body portion 1431 of the corresponding spacing plate 143 opposite to the surface on which the extending portion 1432 is provided and is electrically connected (such as welded) to the electrode tabs 121 of the plurality of secondary batteries 12 arranged side by side so as to connect the plurality of secondary batteries 12 in series and/or in parallel. In an alternative embodiment, each secondary battery 12 has two electrode tabs 121 which are opposite in polarity and extend toward one end of the frame 11 in the axial direction.

Figure 12:
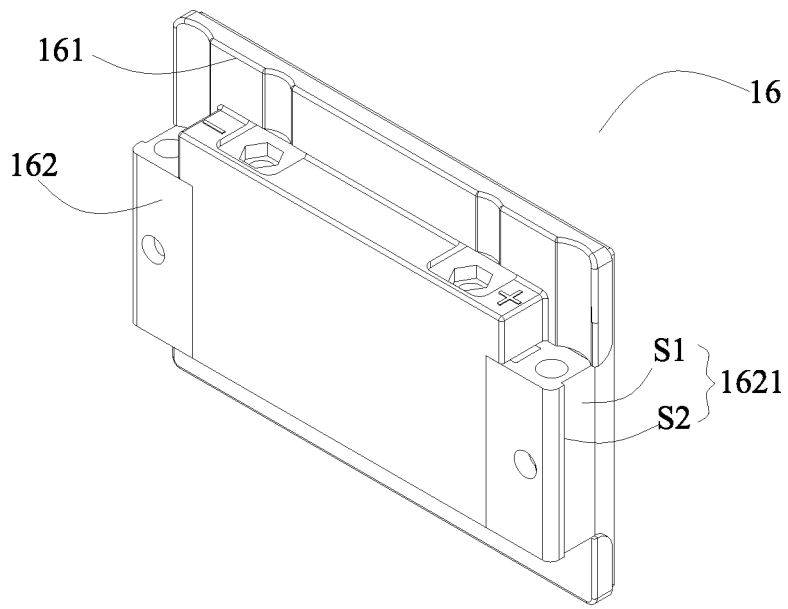
FIG. 12 is a perspective view of a first end plate of the battery module according to the present disclosure.
Figure 13:
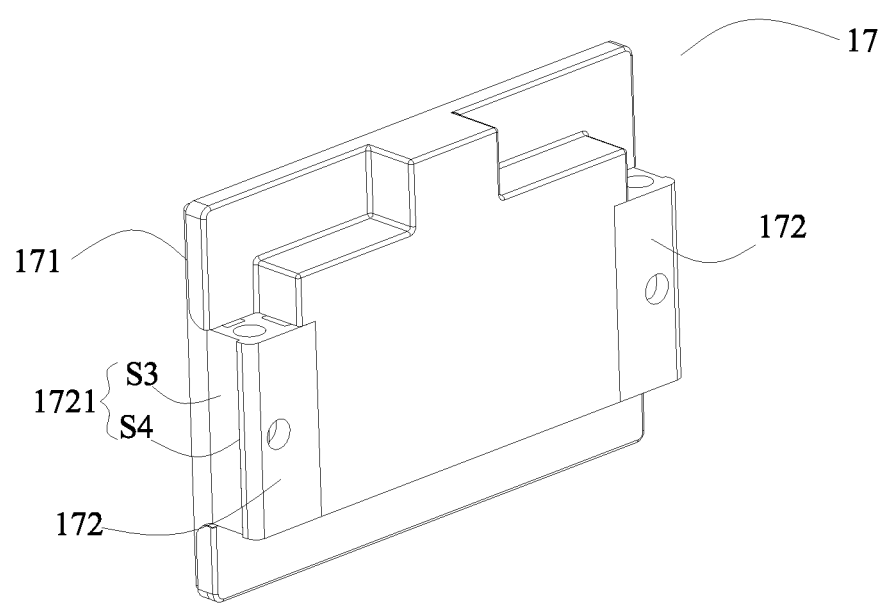
FIG. 13 is a perspective view of the second end plate of the battery module according to the present disclosure.

In the battery module 1 of the second aspect according to the present disclosure, as shown in FIG. 6, FIG. 12 and FIG. 13, the battery module 1 further comprises: a first end plate 16 and a second end plate 17 respectively securely connected to the two ends of the frame 11 in the axial direction so as to respectively close the two ends of the receiving cavity 112 of the frame 11 in the axial direction.

The first end plate 16 and the second end plate 17 can be arranged in a variety of ways.

In an embodiment, as shown in FIG. 12, the first end plate 16 comprises a first plate body 161 and two first inserts 162 respectively securely provided on a left side and a right side of the first end plate 16, a part of each first insert 162 is embedded in the first plate body 161 and each first insert 162 is securely connected to the peripheral wall 111 of the frame 11. As shown in FIG. 13, the second end plate 17 comprises a second plate body 171 and two second inserts 172 respectively securely provided on a left side and a right side of the second end plate 17, a part of each second insert 172 is embedded in the second plate body 171 and each second insert 172 is securely connected to the peripheral wall 111 of the frame 11. In the embodiment, a material of the first plate body 161 is plastic, a material of the first insert 162 is aluminum. The first plate body 161 and the two first inserts 162 are integrally formed by inject molding. Similarly, a material of the second plate body 171 is plastic, a material of the second insert 172 is aluminum. Preferably, the second plate body 171 and the two second inserts 172 are integrally formed by inject molding.

The secure connection between the first end plate 16 and the second end plate 17 and the frame 11 can be achieved in a variety of ways.

In an embodiment, referring to FIG. 6, FIG. 12 and FIG. 13, the two ends of the peripheral wall 111 of the frame 11 in the axial direction are respectively provided with protruding portions C protruding outwardly along the axial direction; the first insert 162 has a first step portion 1621, the first step portion 1621 has a first surface S1 and a second surface S2 intersected by the first surface S1, each protruding portion C of the frame 11 at one end in the axial direction is attached onto the first surface S1, and a periphery of the protruding portion C of the frame 11 at one end in the axial direction is welded with an edge of the first surface S1 of the first step portion 1621 and an edge of the second surface S2 of the first step portion 1621 together. Similarly, the second insert 172 has a second step portion 1721, the second step portion 1721 has a third surface S3 and a fourth surface S4 intersected by the third surface S3, each protruding portion C of the frame 11 at the other end in the axial direction is attached onto the third surface S3, and a periphery of each protruding portion C of the frame 11 at the other end in the axial direction is welded with an edge of the third surface S3 of the second step portion 1721 and an edge of the fourth surface S4 of the second step portion 1721 together.

Figure 15:
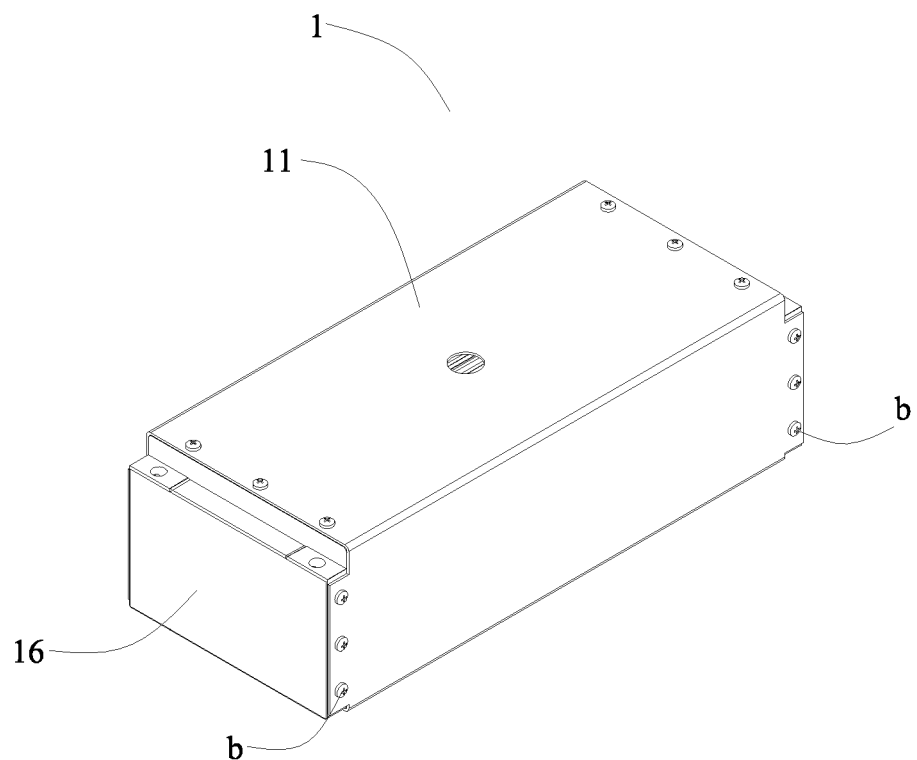
FIG. 15 is a perspective view of FIG. 14 after assembled.

Alternatively, as shown in FIG. 14 and FIG. 15, the first end plate 16 and the second end plate 17 is made of die cast aluminum. The two ends of the peripheral wall 111 of the frame 11 in the axial direction are respectively provided with protruding portions C protruding outwardly along the axial direction. The left side and the right side of the first end plate 16 and the left side and the right side of the second end plate 17 are respectively provided with a plurality of screw holes H; each protruding portion C of the frame 11 is provided with a plurality of through holes C1, each through hole C1 corresponds to each screw hole H; the battery module 1 further comprises a plurality of screws b, each screw b passes through each through hole C1 of the protruding portion C of the frame 11 and each screw hole H of the first end plate 16 and second end plate 17 so as to fix the first end plate 16 and the second end plate 17 to the two ends of frame 11 in axial direction respectively. The first end plate 16 and the second end plate 17 made by die cast aluminum can improve the overall rigidity of the battery module 1 and the anti-deformation capability when the battery module 1 is subjected to the impact and/or vibration.

Next, an assembling method of the battery module 1 of the second aspect of the present disclosure will be exemplified.

An assembling method of the battery module 1 according to the second aspect of the present disclosure comprises steps of: providing elastic buffering pads 141 respectively between every two adjacent secondary batteries 12 and the surfaces of two secondary batteries 12 positioned at the outermost sides of the arrangement direction so as to form a combination; second, pressing the combination to compress the elastic buffering pads 141 by an assembling tool so as to insert the combination into the receiving cavity 112 of the frame 11; after the combination is inserted into the frame 11, loosening the assembling tool, the elastic buffering pads 141 elastically recover, which results in that the plurality of elastic buffering pads 141 and the two side walls S together clamp the plurality of secondary batteries 12; providing the two spacing plates 143 on a front end and a rear end of the plurality of secondary batteries 12 arranged side by side respectively so as to limit the positions of the plurality of secondary batteries 12 arranged side by side; providing a plurality of electrical conductive connection pieces 15 and a plurality of electrode tabs 121 of the secondary batteries 12 on the two spacing plates 143 and welding them together (of course, the electrical conductive connection pieces 15 may be welded and connected to the plurality of electrode tabs 121 of the secondary batteries 12 passing through the spacing plates 143 after the adhesive 13 in liquid state is injected); injecting the adhesive 13 in liquid state into the frame 11 via the adhesive injection hole H of the frame 11, the adhesive 13 in liquid state fills into the gaps between every two adjacent secondary batteries 12 and the gaps between an outer periphery of the plurality of secondary batteries 12 and an inner peripheral surface of the frame 11 (based on the principle of communication in physics, the adhesive 13 in liquid state will fill all the gaps where the adhesive 13 in liquid state are possible to flow into from bottom to top) and will be cured; welding and connecting the first end plate 16 and the second end plate 17 (or connected via a screw) to the two ends of the frame 11 in the axial direction respectively.

What is claimed is:

1. A battery module, comprising:
   a plurality of secondary batteries arranged side by side;
   wherein the battery module further comprises:
   a frame, the frame is composed of a peripheral wall, the peripheral wall encloses to form a receiving cavity which is closed in a circumferential direction and is opened at two ends in an axial direction, the peripheral wall is provided with at least one adhesive injection hole passing through the peripheral wall, the plurality of secondary batteries arranged side by side are received in the receiving cavity of the frame;
   an adhesive that comprises:
   a first part which adheres every two adjacent secondary batteries together;
   a second part which adheres two secondary batteries positioned at outermost sides of the plurality of secondary batteries in an arrangement direction and the peripheral wall of the frame together;
   a third part which adheres a lower side of the first part and a lower side of the second part and the peripheral wall together.

2. The battery module according to claim 1, wherein the battery module further comprises:
   a position-limiting structure which spaces every two adjacent secondary batteries apart and spaces the secondary batteries positioned at the outermost sides of the plurality of secondary batteries in the arrangement direction apart from the peripheral wall of the frame.

3. The battery module according to claim 2, wherein the position-limiting structure comprises:
a plurality of elastic buffering pads respectively positioned between every two adjacent secondary batteries and between the secondary batteries positioned at the outermost side of the plurality of secondary batteries in the arrangement direction and the peripheral wall of the frame.

4. The battery module according to claim 2, wherein the position-limiting structure comprises:
a plurality of position-limiting adhesive layers respectively positioned between every two adjacent secondary batteries and positioned between the secondary batteries positioned at the outermost sides of the plurality of secondary batteries in the arrangement direction and the peripheral wall of the frame.

5. The battery module according to claim 2, wherein
the position-limiting structure comprises: two spacing plates respectively provided at two ends of the frame in the axial direction;
each spacing plate comprises:
a body portion; and
a plurality of extending portions spaced apart from each other and arranged on a surface of the body portion;
the plurality of extending portions of each spacing plate are respectively clamped between every two adjacent secondary batteries and between the secondary batteries positioned at the outermost sides of the plurality of secondary batteries in the arrangement direction and the peripheral wall of the frame.

6. The battery module according to claim 2, wherein the battery module further comprises:
a first end plate and a second end plate respectively securely connected to two ends of the frame in the axial direction so as to respectively close the two ends of the receiving cavity of the frame in the axial direction.

7. The battery module according to claim 6, wherein
the first end plate comprises:
a first plate body; and
two first inserts respectively securely provided on a left side and a right side of the first end plate, a part of each first insert is embedded in the first plate body and each first insert is securely connected to the peripheral wall of the frame;
the second end plate comprises:
a second plate body; and
two second inserts respectively securely provided on a left side and a right side of the second end plate, a part of each second insert is embedded in the second plate body and each second insert is securely connected to the peripheral wall of the frame.

8. The battery module according to claim 7, wherein
two ends of the peripheral wall of the frame in the axial direction are respectively provided with protruding portions protruding outwardly along the axial direction;
each first insert has a first step portion, the first step portion has a first surface and a second surface intersected by the first surface, each protruding portion of the frame at one end in the axial direction is attached onto the first surface, and a periphery of each protruding portion of the frame at one end in the axial direction is welded with an edge of the first surface of the first step portion and an edge of second surface of the first step portion together;
each second insert has a second step portion, the second step portion has a third surface and a fourth surface intersected by the third surface, each protruding portion of the frame at the other end in the axial direction is attached onto the third surface, and a periphery of each protruding portion of the frame at the other end in the axial direction is welded with an edge of the third surface of the second step portion and an edge of the fourth surface of the second step portion together.

9. The battery module according to claim 7, wherein
two ends of the peripheral wall of the frame in the axial direction are respectively provided with protruding portions protruding outwardly along the axial direction;
the left side and the right side of the first end plate and the left side and the right side of the second end plate are respectively provided with a plurality of screw holes;
each protruding portion of the frame is provided with a plurality of through holes, each through hole corresponds to each screw hole;
the battery module further comprises a plurality of screws, each screw passes through each through hole of each protruding portion of the frame 11 and each screw hole of the first end plate and second end plate so as to fix the first end plate and the second end plate to the two ends of frame in the axial direction respectively.

10. The battery module according to claim 1, wherein the peripheral wall is composed of a top wall, a bottom wall and two side walls, the top wall, the bottom wall and the two side walls are integrally formed.

* * * * *